United States Patent
Rahmati et al.

(10) Patent No.: US 12,086,961 B2
(45) Date of Patent: Sep. 10, 2024

(54) METHOD AND APPARATUS FOR ADAPTIVE HYBRID FUSION

(71) Applicant: Samsung Electronics Co., Ltd., Gyeonggi-do (KR)

(72) Inventors: Mojtaba Rahmati, San Diego, CA (US); Dongwoon Bai, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 254 days.

(21) Appl. No.: 17/244,481

(22) Filed: Apr. 29, 2021

(65) Prior Publication Data

US 2022/0188985 A1 Jun. 16, 2022

Related U.S. Application Data

(60) Provisional application No. 63/124,247, filed on Dec. 11, 2020.

(51) Int. Cl.
*G06K 9/00* (2022.01)
*G06T 5/70* (2024.01)
*H04N 25/60* (2023.01)

(52) U.S. Cl.
CPC .............. *G06T 5/70* (2024.01); *H04N 25/60* (2023.01); *G06T 2207/20024* (2013.01); *G06T 2207/20221* (2013.01)

(58) Field of Classification Search
CPC .......... G06T 5/002; G06T 2207/20024; G06T 2200/28; G06T 2207/20221; G06T 5/003; H04N 25/60; G10L 21/0208
See application file for complete search history.

(56) References Cited

U.S. PATENT DOCUMENTS

| | | | |
|---|---|---|---|
| 7,729,555 B2 | 6/2010 | Chen et al. | |
| 8,145,005 B2 | 3/2012 | Incesu et al. | |
| 8,345,158 B2 | 1/2013 | Robertson et al. | |
| 8,953,903 B2 | 2/2015 | Peng et al. | |
| 2004/0091174 A1* | 5/2004 | Wang | G06T 5/70 382/300 |
| 2005/0265633 A1* | 12/2005 | Piacentino | G06T 5/50 382/265 |
| 2007/0116373 A1 | 5/2007 | Hwang et al. | |
| 2008/0152247 A1* | 6/2008 | Oh | G06V 10/30 382/266 |

(Continued)

OTHER PUBLICATIONS

N. Iqbal, S. Saleem, W. Jehan and K. Ahmad, "Reduction of speckle noise in medical images using stationary wavelet transform and fuzzy logic," 2017 International Symposium on Recent Advances in Electrical Engineering (RAEE), Islamabad, Pakistan, 2017, pp. 1-6, doi: 10.1109/RAEE.2017.8246142. (Year: 2017).*

*Primary Examiner* — Gregory A Morse
*Assistant Examiner* — Kevin M Coomber
(74) *Attorney, Agent, or Firm* — The Farrell Law Firm, P.C.

(57) ABSTRACT

A method and system are provided. The method includes receiving an input frame, performing high frequency noise reduction (HFNR) on the received input frame, performing low frequency noise reduction (LFNR) on the received input frame, and obtaining a hybrid denoised clean frame by fusing an output of the performed HFNR and an output of the performed LFNR.

18 Claims, 5 Drawing Sheets

(56) References Cited

U.S. PATENT DOCUMENTS

| | | | |
|---|---|---|---|
| 2009/0040386 A1* | 2/2009 | Ishiga | G06T 5/002 |
| | | | 348/607 |
| 2013/0329004 A1* | 12/2013 | Baqai | G06T 5/002 |
| | | | 348/241 |
| 2014/0212015 A1 | 7/2014 | Ding et al. | |
| 2016/0080626 A1 | 3/2016 | Kovtun et al. | |
| 2016/0140696 A1* | 5/2016 | Yamada | G06T 5/10 |
| | | | 382/167 |
| 2017/0308995 A1* | 10/2017 | Senzaki | G06T 7/168 |

* cited by examiner

METHOD AND APPARATUS FOR ADAPTIVE HYBRID FUSION

PRIORITY

This application is based on and claims priority under 35 U.S.C. § 119(e) to U.S. Provisional Patent Application Ser. No. 63/124,247, filed on Dec. 11, 2020, the entire contents of which are incorporated herein by reference.

FIELD

The present disclosure is generally related to image denoising.

BACKGROUND

In image fusion, it is desirable to provide practical multi-frame image denoising solutions and to enhance multi-frame image processing quality.

SUMMARY

According to one embodiment, a method includes receiving an input frame, performing high frequency noise reduction (HFNR) on the received input frame, performing low frequency noise reduction (LFNR) on the received input frame, and obtaining a hybrid denoised clean frame by fusing an output of the performed HFNR and an output of the performed LFNR.

According to one embodiment, a system includes a memory and a processor configured to receive an input frame, perform HFNR on the received input frame, perform LFNR on the received input frame, and obtain a hybrid denoised clean frame by fusing an output of the performed HFNR and an output of the performed LFNR.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The present system and method provides a hybrid denoising structure to dynamically apply LFNR on non-texture regions. The adaptive spatial denoising may be applied over mid and high frequency bands and an independent LFNR may be applied over low frequency bands. The final denoising result may be obtained through hybrid fusion of the two independent denoising outputs by selecting the high frequency bands from the HFNR output and adaptively selecting the low frequency band results between the HFNR and the LFNR low frequency outputs. The hybrid fusion may be controlled through a hybrid fusion weight map obtained using the output of the HFNR.

The present system and method provides a low complexity LFNR denoising structure with decimated wavelet based decomposition. Since the LFNR is only targeting denoising over low frequency bands which are not covered by HFNR, the low frequency signal may be extracted from the input through filtering and as the high frequency details are filtered out, the present system and method may apply a decimated wavelet decomposition to reduce the dimension of the low frequency signal and may apply denoising over the decimated low frequency subband which reduces the complexity significantly.

A system model with a single frame image denoising where the noisy input frame may be either the fusion output of a multi-frame fusion block or a single frame capture with y(x,y) denoting the luminance of the noisy input frame may be considered, with c(x,y) denoting the chrominance of the noisy input frame (either U or V channels), and (x, y) denoting the 2D spatial pixel position. $Y_s(i,j)$ is defined as (i,j)-th wavelet coefficient of $s \in \{LH, HL, HH, LL\_LH, LL\_LH, LL\_HH, LL\_LL\}$ subband of y and $C_s(i,j)$ is defined as (i,j)-th wavelet coefficient of s subband of c.

In denoising, the goal is to reduce the noise as much as possible without sacrificing around details and edges. More denoising and averaging over wider tiles may be desirable for flat areas. However, aggressively denoising and averaging over wide tiles washes out the details and blurs the edges. Therefore, the present system and method distinguishes between flat regions and details and edges, and adopts the denoising level accordingly.

The present system and method provides a hybrid denoising process where two different denoisings are applied over the input frame, namely HFNR and LFNR. HFNR and LFNR denoising may be applied independently and the two denoising results are referred to as Clean1 and Clean2, respectively. Finally, the two denoising results are blended according to the hybrid fusion weight DN_W, which may be obtained using edge information of the HFNR result.

Different denoising schemes may be adopted as HFNR, such as non-local mean (NLM) denoising with small patch sizes or transform domain based denoising focused on high and mid frequency band denoising. The structure of transform domain denoising with the use of un-decimated Haar decomposition is utilized.

One goal in HFNR denoising is to suppress the high frequency noises. The high frequency extraction is attained through undecimated Haar wavelet decomposition and the denoising is performed by a shrinkage operation over the high frequency components. The overall HFNR process may be performed as described below.

Figure 1:
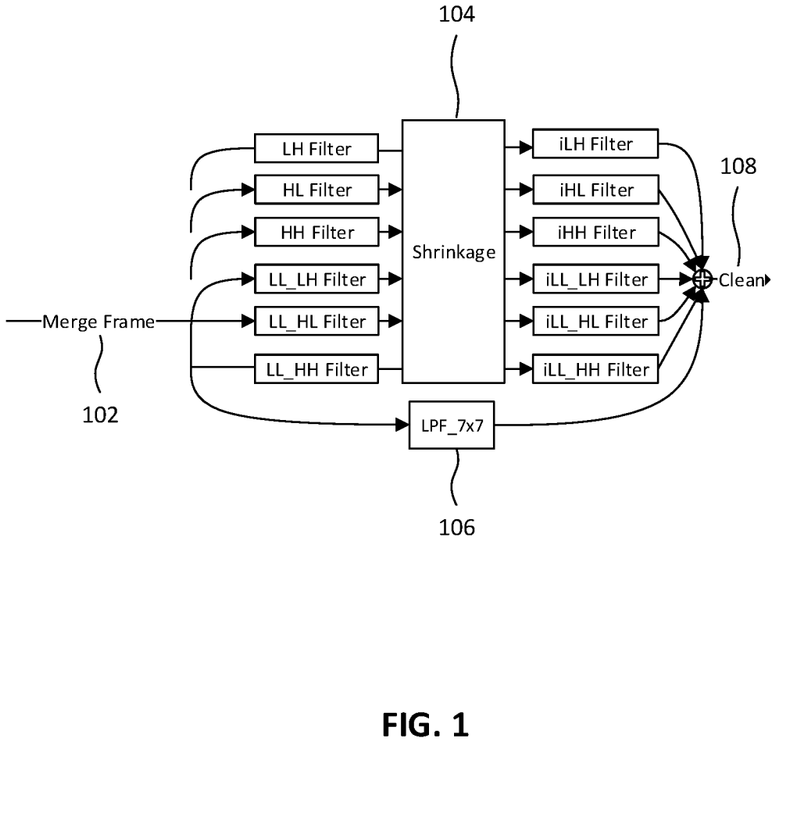
FIG. 1 illustrates a diagram of a HFNR denoising system, according to an embodiment.

First, the system extracts the low-high (LH), high-low (HL), high-high (HH), low-low (LL)–LH (LL_LH), LL_HL and LL_HH subbands of undecimated Haar decompositions. The decomposition filters may be obtained as in Equations (1)-(6).

$$LH \text{ decomposition filter} = \begin{bmatrix} 1 & -1 \\ 1 & -1 \end{bmatrix}/2 \quad (1)$$

$$HH \text{ decomposition filter} = \begin{bmatrix} 1 & 1 \\ -1 & -1 \end{bmatrix}/2 \quad (2)$$

$$HH \text{ decomposition filter} = \begin{bmatrix} 1 & -1 \\ -1 & 1 \end{bmatrix}/2 \quad (3)$$

$$LL\_LH \text{ decomposition filter} = \begin{bmatrix} 1 & 1 & -1 & -1 \\ 1 & 1 & -1 & -1 \\ 1 & 1 & -1 & -1 \\ 1 & 1 & -1 & -1 \end{bmatrix}/4 \quad (4)$$

$$LL\_HL \text{ decomposition filter} = \begin{bmatrix} 1 & 1 & 1 & 1 \\ 1 & 1 & 1 & 1 \\ -1 & -1 & -1 & -1 \\ -1 & -1 & -1 & -1 \end{bmatrix}/4 \quad (5)$$

$$LL\_LH \text{ decomposition filter} = \begin{bmatrix} 1 & 1 & -1 & -1 \\ 1 & 1 & -1 & -1 \\ -1 & -1 & 1 & 1 \\ -1 & -1 & 1 & 1 \end{bmatrix}/4 \quad (6)$$

Next, the system applies a shrinkage operation over LH, HL, HH, LL_LH, LL_HL and LL_HH subbands, as in Equation (7):

$$\hat{Y}_{0,s}(i, j) = \frac{|\tilde{Y}_s(i, j)|^2}{|\tilde{Y}_s(i, j)|^2 + c_s \sigma^2} \tilde{Y}_s(i, j) \quad (7)$$

where $c_s \sigma^2$ is the tuning parameter and $S \in \{LH, HL, HH, LL\_LH, LL\_HL, LL\_HH\}$.

The system then reconstructs the denoised subbands. The reconstruction filters are shown in Equations (8)-(13).

$$iLH \text{ reconstruction filter} = \begin{bmatrix} -1 & 1 \\ -1 & 1 \end{bmatrix}/4 \quad (8)$$

$$iHL \text{ reconstruction filter} = \begin{bmatrix} -1 & -1 \\ 1 & 1 \end{bmatrix}/4 \quad (9)$$

$$iHH \text{ reconstruction filter} = \begin{bmatrix} 1 & -1 \\ -1 & 1 \end{bmatrix}/4 \quad (10)$$

$$iLL\_LH \text{ reconstruction filter} = \begin{bmatrix} -1 & -1 & 1 & 1 \\ -1 & -1 & 1 & 1 \\ -1 & -1 & 1 & 1 \\ -1 & -1 & 1 & 1 \end{bmatrix}/64 \quad (11)$$

$$iLL\_HL \text{ reconstruction filter} = \begin{bmatrix} -1 & -1 & -1 & -1 \\ -1 & -1 & -1 & -1 \\ 1 & 1 & 1 & 1 \\ 1 & 1 & 1 & 1 \end{bmatrix}/64 \quad (12)$$

$$iLL\_LH \text{ reconstruction filter} = \begin{bmatrix} 1 & 1 & -1 & -1 \\ 1 & 1 & -1 & -1 \\ -1 & -1 & 1 & 1 \\ -1 & -1 & 1 & 1 \end{bmatrix}/64 \quad (13)$$

The system extracts the low frequency signal corresponding to the LL_LL undecimated Haar subbands with direct filtering, as in Equation (14).

$$LPF_{7\times7} = \begin{bmatrix} 1 & 2 & 3 & 4 & 3 & 2 & 1 \\ 2 & 4 & 6 & 8 & 6 & 4 & 2 \\ 3 & 6 & 9 & 12 & 9 & 6 & 3 \\ 4 & 8 & 12 & 16 & 12 & 8 & 4 \\ 3 & 6 & 9 & 12 & 9 & 6 & 3 \\ 2 & 4 & 6 & 8 & 6 & 4 & 2 \\ 1 & 2 & 3 & 4 & 3 & 2 & 1 \end{bmatrix}/256 \quad (14)$$

which is equivalent with LL_LL decompositions and reconstruction. $LP_1$ (which is referred to as $Med_1$ as well) is defined as in Equation (15).

$$LP_1 = LPF_{7\times7} * MergedLuma \quad (15)$$

The system then combines the results of Equations (8)-(13) with the result of Equation (14) to generate a clean frame.

FIG. 1 illustrates a diagram of an HFNR denoising system, according to an embodiment. The system receives a single merge frame 102, which is then processed by the LH decomposition filter, HL decomposition filter, HH decomposition filter, LL_LH decomposition filter, LL_HL decomposition filter, and the LL_HH decomposition filter. The system performs a shrinkage operation 104 on the outputs of the decomposition filters, and the system outputs the result of the shrinkage operation to the iLH reconstruction filter, the iHL reconstruction filter, the iHH reconstruction filter, the iLL_LH reconstruction filter, the iLL_HL reconstruction filter, and the iLL_HH reconstruction filter. The system also extracts the low frequency signal corresponding to the LL_LL subband to produce the low-pass filtering (LPF) 7×7 output 106. The outputs of the reconstruction filters and the LPF 7×7 output 106 are combined to produce a clean frame 108.

The HFNR block targets high frequency denoising and the result of HFNR is used to extract sharp signals and to obtain the hybrid denoising fusion weight as well. Joint low and high frequency denoising can result in loss of details before sharpening, so the joint low and high frequency denoising may be omitted. Low frequency denoising may be applied for low light images which are heavily distorted with low frequency noises. One goal of hybrid denoising is to effectively apply low frequency denoising in flat regions and apply no denoising in texture regions and on edges. Therefore, the system applies LFNR independent of HFNR by targeting denoising of the low frequency bands which are not covered by HFNR. For final fusion, the system takes the high frequency components from HFNR results and selectively chooses the low frequency components from the LFNR and the HFNR results through smart hybrid fusion.

Figure 2:
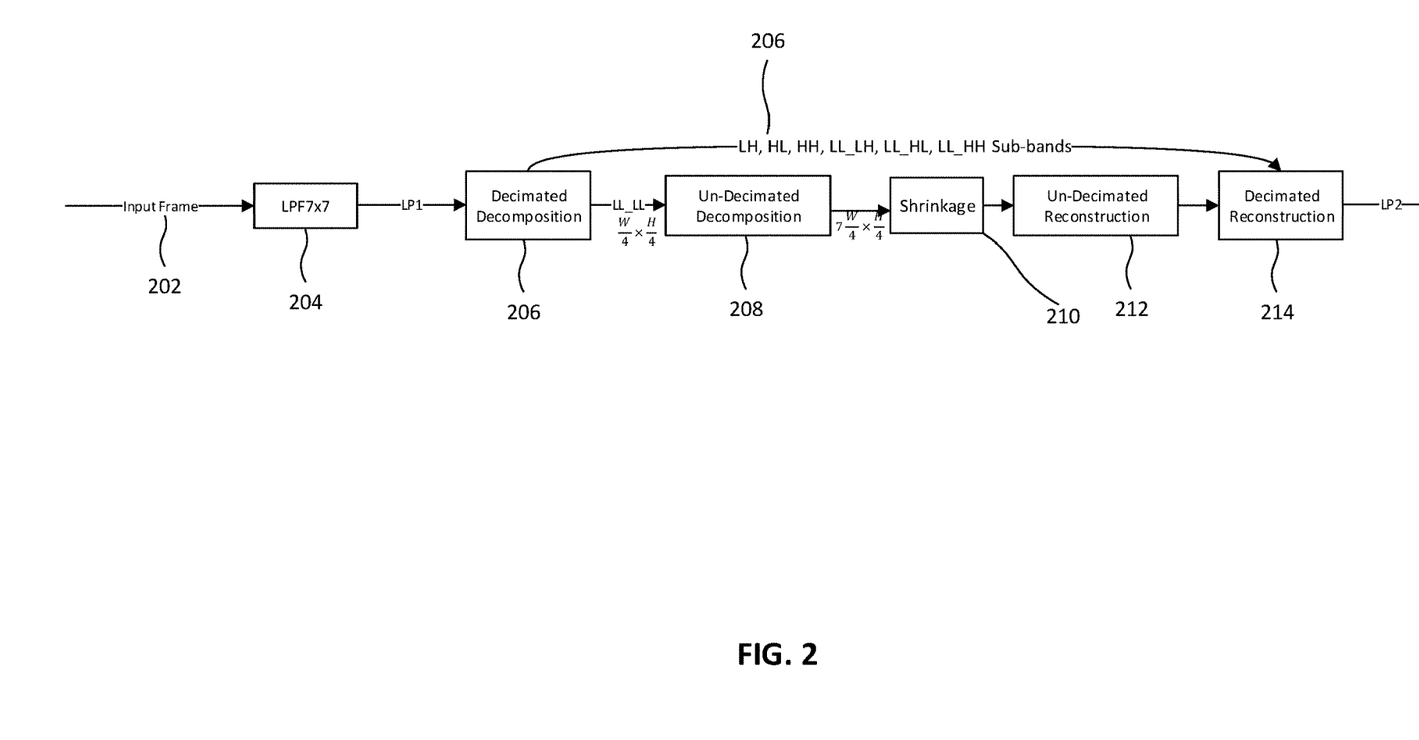
FIG. 2 illustrates a diagram of a LFNR denoising system, according to an embodiment.

In LFNR, the system applies the 7×7 LPF applied in HFNR of Equation (14) to exclude level 1 (i.e., output of LH, HL and HH filters) and level 2 (i.e., the output of LL_LH, LL_HL and LL_HH filters) high frequency subbands of undecimated Haar wavelets. The system then applies a decimated decomposition (e.g., level2-Sym4) over the low frequency result of the 7×7 LPF. By applying the decimated decomposition, the resolution of the LL_LL subband is a quarter of the size of the input image, which reduces the memory requirement and overall complexity significantly. Decimation is applied over the low frequency signal which is obtained with 7×7 LPF. The LFNR result may be fused with the HFNR result, where the fusion weight only picks the LFNR result in flat regions.

The system applies a further undecimated Haar decomposition over the LL_LL subband. The system then applies a non-linear operation over high frequency subbands of the undecimated Haar decomposition results, as in Equation (16):

$$\hat{Y}_s(i,j) = \frac{|\tilde{Y}_s(i,j)|^2}{|\tilde{Y}_s(i,j)|^2 + c_s\sigma^2} \tilde{Y}_s(i,j) \quad (16)$$

where $c_s\sigma^2$ is the tuning parameter. The system then applies an undecimated Haar reconstruction over the denoised LL_LL decomposed subbands. Then, the system applies a decimated reconstruction where the high frequency subbands of the wavelet transform (e.g., Sym4) decomposition are un-changed and only the LL_LL subband is denoised with further undecimated Haar decomposition.

FIG. 2 illustrates a diagram of an LFNR denoising system, according to an embodiment. At 204, the system applies a 7×7 LPF on an input frame 202. At 206, the system performs a decimated decomposition on the output of the LPF and extracts the LL_LL subband. At 208, the system performs an undecimated decomposition on the LL_LL subband. At 210, the system performs a shrinkage operation based on the output of the undecimated decomposition. At 212, the system performs an undecimated reconstruction on the output of the shrinkage operation. At 214, the system performs a decimated reconstruction with the remaining subbands.

In denoising, one goal is to reduce the noise as much as possible without sacrificing heavily around details and edges. More denoising and averaging over wider tiles is desirable for flat areas. Aggressive denoising and averaging over wide tiles washes out the details and blurs the edges. Therefore, one strategy is to distinguish between a flat region and details and edge regions and adopt the denoising level accordingly.

Figure 3:
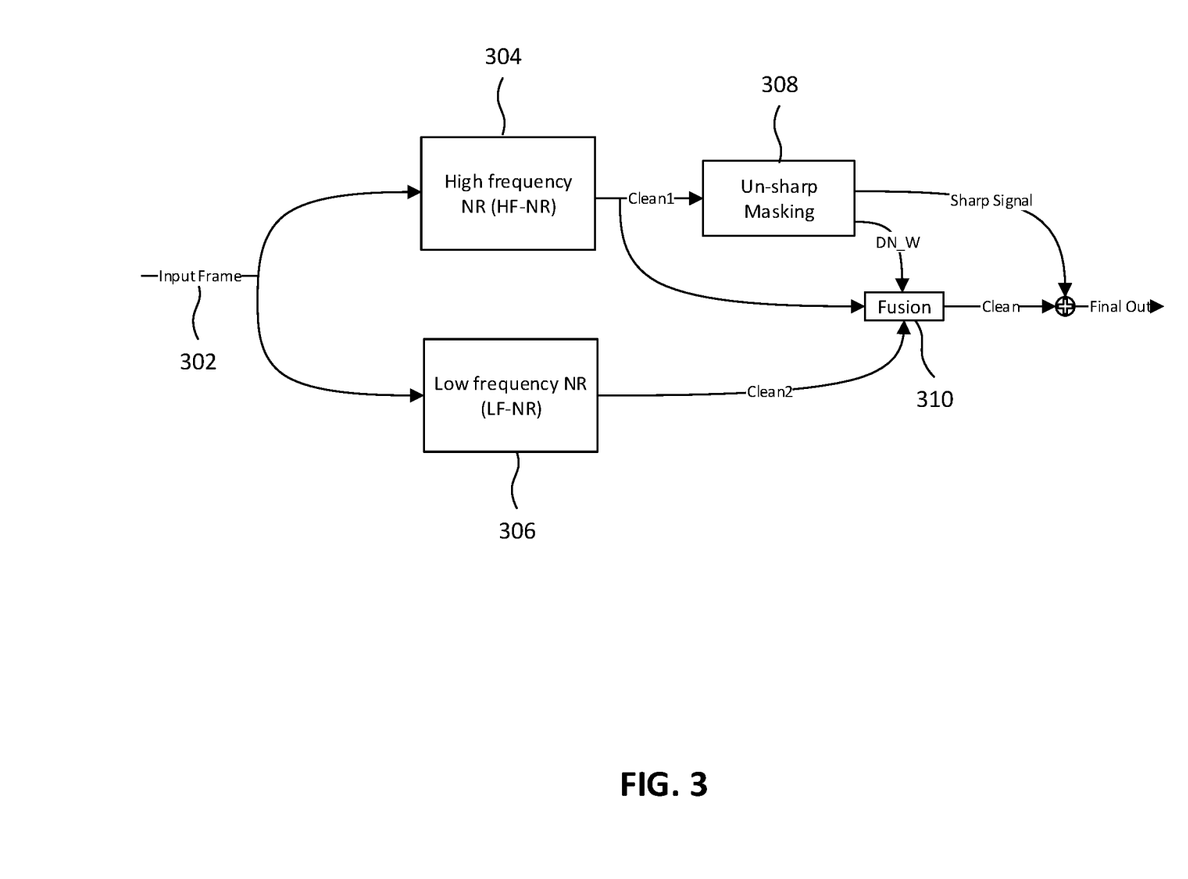
FIG. 3 illustrates a diagram of a hybrid denoising system, according to an embodiment.

The HFNR targets high frequency denoising and LFNR targets low frequency denoising. Therefore, to obtain the final clean signal, the system utilizes the high frequency signal from HFNR and for the low frequency part of the signal, the system softly switches between $LP_1$ (defined in Equation (14), which is the low frequency signal extracted from the input frame) and clean$_2$, which is the output of the LFNR obtained with denoising over LP$_1$, as in Equation (17):

$$\text{Clean}=\text{Clean}_1-LP_1+DN_W\times LP_1+(1-DN_W)\times\text{Clean}_2 \quad (17)$$

where DN_W is obtained using edge strength information of the output of HF-NR. A fusion weight is extracted from the HFNR output as in Equations (18)-(20).

$$g_V = \begin{bmatrix} 1 & 2 & 1 \\ 0 & 0 & 0 \\ -1 & -2 & -1 \end{bmatrix} * clean_1 \quad (18)$$

$$g_H = \begin{bmatrix} 1 & 0 & -1 \\ 2 & 0 & -2 \\ 1 & 0 & -1 \end{bmatrix} * clean_1 \quad (19)$$

$$ES = \sqrt{g_V^2 + g_H^2} \quad (20)$$

The system obtains the hybrid denoising fusion weight $DN_W$ as in Equation (21):

$$DN_W=\text{Blur}(\min(\max(ES-\text{CoringThr},0)\times\text{CoringSlp},1.0)) \quad (21)$$

where coringThr and coringSlp are tunable parameters. Furthermore, $DN_W$ is close to 1 for details and edges and close to 0 in flat regions. Therefore, the high frequency bands are selected from the HFNR of level 1 and level 2 undecimated Haar subbands and the low frequency band result are dynamically selected between the HFNR and LFNR results. DN_W→1 for edge and texture regions and DN_W→0 for flat regions. Therefore, clean$_2$ (i.e., low frequency result of LFNR) is used in flat regions and LP$_1$ (i.e., low frequency results of HFNR) is used for other regions and the high frequency part of the output is always selected from the HFNR (Clean$_1$–LP$_1$).

FIG. 3 illustrates a diagram of a hybrid denoising system, according to an embodiment. At 302, the system receives an input frame. At 304, the system performs a HFNR on the input frame. At 306, the system performs a LFNR on the input frame. At 308, the system performs an un-sharp masking sharpening scheme. At 310, the outputs of the HFNR and the LFNR are fused, and the clean image is output.

Figure 4:
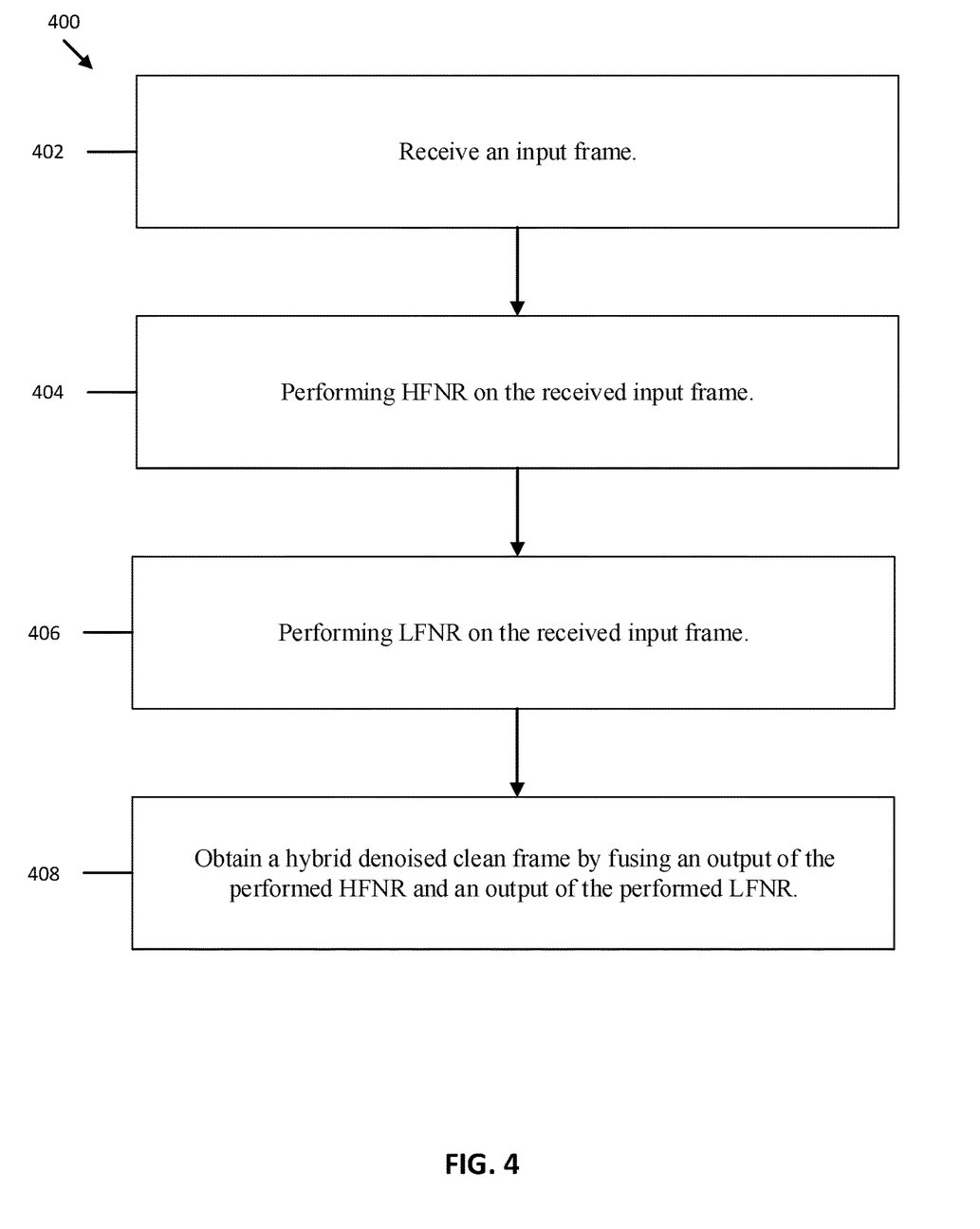
FIG. 4 illustrates a flowchart of a method of hybrid denoising, according to an embodiment.

FIG. 4 illustrates a flowchart 400 of a method of hybrid denoising, according to an embodiment. At 402, the system receives an input frame. At 404, the system performs HFNR on the received input frame. At 406, the system performs LFNR on the received input frame. At 408, the system obtains a hybrid denoised clean frame by fusing an output of the performed HFNR and an output of the performed LFNR.

Figure 5:
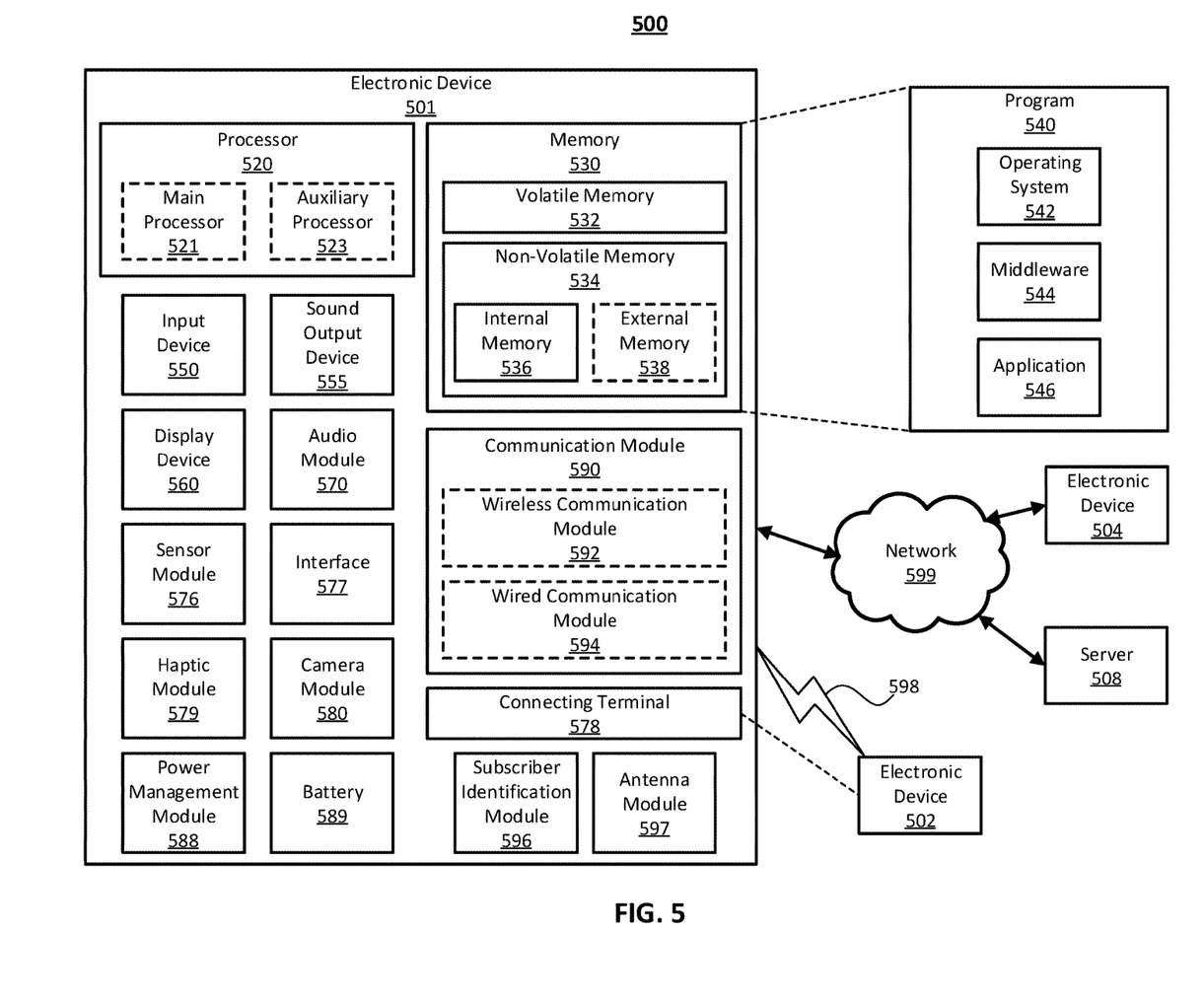
FIG. 5 illustrates a block diagram of an electronic device in a network environment, according to one embodiment.

FIG. 5 illustrates a block diagram of an electronic device 501 in a network environment 500, according to one embodiment. Referring to FIG. 5, the electronic device 501 in the network environment 500 may communicate with an electronic device 502 via a first network 598 (e.g., a short-range wireless communication network), or an electronic device 504 or a server 508 via a second network 599 (e.g., a long-range wireless communication network). The electronic device 501 may communicate with the electronic device 504 via the server 508. The electronic device 501 may include a processor 520, a memory 530, an input device 550, a sound output device 555, a display device 560, an audio module 570, a sensor module 576, an interface 577, a haptic module 579, a camera module 580, a power management module 588, a battery 589, a communication module 590, a subscriber identification module (SIM) 596, or an antenna module 597. In one embodiment, at least one (e.g., the display device 560 or the camera module 580) of the components may be omitted from the electronic device 501, or one or more other components may be added to the electronic device 501. In one embodiment, some of the components may be implemented as a single integrated circuit (IC). For example, the sensor module 576 (e.g., a fingerprint sensor, an iris sensor, or an illuminance sensor) may be embedded in the display device 560 (e.g., a display).

The processor 520 may execute, for example, software (e.g., a program 540) to control at least one other component (e.g., a hardware or a software component) of the electronic device 501 coupled with the processor 520, and may perform various data processing or computations. As at least part of the data processing or computations, the processor 520 may load a command or data received from another component (e.g., the sensor module 576 or the communication module 590) in volatile memory 532, process the command or the data stored in the volatile memory 532, and store resulting data in non-volatile memory 534. The processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally or alternatively, the auxiliary processor 523 may be adapted to consume less power than the main processor 521, or execute a particular function. The auxiliary processor 523 may be implemented as being separate from, or a part of, the main processor 521.

The auxiliary processor 523 may control at least some of the functions or states related to at least one component (e.g., the display device 560, the sensor module 576, or the communication module 590) among the components of the electronic device 501, instead of the main processor 521 while the main processor 521 is in an inactive (e.g., sleep) state, or together with the main processor 521 while the main processor 521 is in an active state (e.g., executing an application). According to one embodiment, the auxiliary processor 523 (e.g., an image signal processor or a communication processor) may be implemented as part of another component (e.g., the camera module 580 or the communication module 590) functionally related to the auxiliary processor 523.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input device 550 may receive a command or data to be used by other component (e.g., the processor 520) of the electronic device 501, from the outside (e.g., a user) of the electronic device 501. The input device 550 may include, for example, a microphone, a mouse, or a keyboard.

The sound output device 555 may output sound signals to the outside of the electronic device 501. The sound output device 555 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 560 may visually provide information to the outside (e.g., a user) of the electronic device 501. The display device 560 may include, for example, a display, a hologram device, or a projector and control circuitry to control a corresponding one of the display, hologram device, and projector. According to one embodiment, the display device 560 may include touch circuitry adapted to detect a touch, or sensor circuitry (e.g., a pressure sensor) adapted to measure the intensity of force incurred by the touch.

The audio module 570 may convert a sound into an electrical signal and vice versa. According to one embodiment, the audio module 570 may obtain the sound via the input device 550, or output the sound via the sound output device 555 or a headphone of an external electronic device 502 directly (e.g., wired) or wirelessly coupled with the electronic device 501.

The sensor module 576 may detect an operational state (e.g., power or temperature) of the electronic device 501 or an environmental state (e.g., a state of a user) external to the electronic device 501, and then generate an electrical signal or data value corresponding to the detected state. The sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device 502 directly (e.g., wired) or wirelessly. According to one embodiment, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device 502. According to one embodiment, the connecting terminal 578 may include, for example, an HDMI connector, a USB connector, an SD card connector, or an audio connector (e.g., a headphone connector).

The haptic module 579 may convert an electrical signal into a mechanical stimulus (e.g., a vibration or a movement) or an electrical stimulus which may be recognized by a user via tactile sensation or kinesthetic sensation. According to one embodiment, the haptic module 579 may include, for example, a motor, a piezoelectric element, or an electrical stimulator.

The camera module 580 may capture a still image or moving images. According to one embodiment, the camera module 580 may include one or more lenses, image sensors, image signal processors, or flashes.

The power management module 588 may manage power supplied to the electronic device 501. The power management module 588 may be implemented as at least part of, for example, a power management integrated circuit (PMIC).

The battery 589 may supply power to at least one component of the electronic device 501. According to one embodiment, the battery 589 may include, for example, a primary cell which is not rechargeable, a secondary cell which is rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication module 590 may include one or more communication processors that are operable independently from the processor 520 (e.g., the AP) and supports a direct (e.g., wired) communication or a wireless communication. According to one embodiment, the communication module 590 may include a wireless communication module 592 (e.g., a cellular communication module, a short-range wireless communication module, or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth™, wireless-fidelity (Wi-Fi) direct, or a standard of the Infrared Data Association (IrDA)) or the second network 599 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 592 may identify and authenticate the electronic device 501 in a communication network, such as the first network 598 or the second network 599, using subscriber information (e.g., international mobile subscriber identity (IMSI)) stored in the subscriber identification module 596.

The antenna module 597 may transmit or receive a signal or power to or from the outside (e.g., the external electronic device) of the electronic device 501. According to one embodiment, the antenna module 597 may include one or more antennas, and, therefrom, at least one antenna appropriate for a communication scheme used in the communication network, such as the first network 598 or the second network 599, may be selected, for example, by the communication module 590 (e.g., the wireless communication module 592). The signal or the power may then be transmitted or received between the communication module 590 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 501 and the external electronic device 504 via the server 508 coupled with the second network 599. Each of the electronic devices 502 and 504 may be a device of a same type as, or a different type, from the electronic device 501. All or some of operations to be executed at the electronic device 501 may be executed at one or more of the external electronic devices 502, 504, or 508. For example, if the electronic device 501 should perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

One embodiment may be implemented as software (e.g., the program 540) including one or more instructions that are stored in a storage medium (e.g., internal memory 536 or external memory 538) that is readable by a machine (e.g., the electronic device 501). For example, a processor of the electronic device 501 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration.

Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising
receiving an input frame;
performing high frequency noise reduction (HFNR) on the received input frame to obtain an HFNR clean frame;
performing low frequency noise reduction (LFNR) on the received input frame to obtain an LFNR clean frame;
obtaining a hybrid fusion weight using edge strength information of the HFRN clean frame; and
obtaining a hybrid denoised clean frame by fusing the HFNR clean frame and the LFNR clean frame, wherein the fusing selects high frequency bands from the HFNR clean frame and, based on the hybrid fusion weight, selects low frequency bands from the LFNR clean frame in flat regions and from the HFNR clean frame in remaining non-flat regions.

2. The method of claim 1, wherein performing the HFNR comprises extracting subbands of undecimated Haar decompositions.

3. The method of claim 2, wherein performing the HFNR further comprises applying a shrinkage operation to the extracted subbands to obtain denoised subbands.

4. The method of claim 3, wherein performing the HFNR further comprises reconstructing the denoised subbands.

5. The method of claim 4, wherein performing the HFNR further comprises extracting a low-low to low-low (LL_LL) subband and applying a low-pass filter (LPF) to the LL_LL subband.

6. The method of claim 5, wherein the HFRN clean frame comprises a combination of an output of the LPF and the reconstructed denoised subbands.

7. The method of claim 1, wherein performing the LFNR comprises extracting a low-low to low-low (LL_LL) subband from the input frame.

8. The method of claim 7, wherein performing the LFNR further comprises performing undecimated decomposition on the LL_LL subband, applying a shrinkage operation to the LL_LL subband, and performing an undecimated reconstruction on the LL_LL subband.

9. The method of claim 8, wherein the LFNR clean frame comprises a combination of a decimated reconstruction of the LL_LL subband.

10. A system, comprising:
a memory; and
a processor configured to:
receive an input frame;
perform high frequency noise reduction (HFNR) on the received input frame to obtain an HFNR clean frame;
perform low frequency noise reduction (LFNR) on the received input frame to obtain an LFNR clean frame;
obtain a hybrid fusion weight using edge strength information of the HFNR clean frame; and
obtain a hybrid denoised clean frame by fusing the HFNR clean frame and the LFNR clean frame, wherein the fusing selects high frequency bands from the HFNR clean frame and, based on the hybrid fusion weight, selects low frequency bands from the LFNR clean frame in flat regions and from the HFNR clean frame in remaining non-flat regions.

11. The system of claim 10, wherein the processor is further configured to perform the HFNR by extracting subbands of undecimated Haar decompositions.

12. The system of claim 11, wherein the processor is further configured to perform the HFNR by applying a shrinkage operation to the extracted subbands to obtain denoised subbands.

13. The system of claim 12, wherein the processor is further configured to perform the HFNR by reconstructing the denoised subbands.

14. The system of claim 13, wherein the processor is further configured to perform the HFNR by extracting a low-low to low-low (LL_LL) subband and applying a low-pass filter (LPF) to the LL_LL subband.

15. The system of claim 14, wherein the HFNR clean frame comprises a combination of an output of the LPF and the reconstructed denoised subbands.

16. The system of claim 10, wherein the processor is further configured to perform the LFNR by extracting a low-low to low-low (LL_LL) subband from the input frame.

17. The system of claim 16, wherein the processor is further configured to perform the LFNR further by performing undecimated decomposition on the LL_LL subband, applying a shrinkage operation to the LL_LL subband, and performing an undecimated reconstruction on the LL_LL subband.

18. The system of claim 17, wherein the LFNR clean frame comprises a combination of a decimated reconstruction of the LL_LL subband.

* * * * *